United States Patent
Conway

(10) Patent No.: US 11,788,587 B2
(45) Date of Patent: Oct. 17, 2023

(54) WEAR LIMITER FOR CENTRIFUGAL CLUTCH

(71) Applicant: Carrier Corporation, Palm Beach Gardens, FL (US)

(72) Inventor: Richard Conway, Athens, GA (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/301,401

(22) Filed: Apr. 1, 2021

(65) Prior Publication Data

US 2021/0317884 A1 Oct. 14, 2021

Related U.S. Application Data

(60) Provisional application No. 63/008,879, filed on Apr. 13, 2020.

(51) Int. Cl.
*F16D 43/18* (2006.01)

(52) U.S. Cl.
CPC ................... *F16D 43/18* (2013.01)

(58) Field of Classification Search
CPC .......................... F16D 43/18; F16D 2043/145
USPC ...................................................... 192/103 b
See application file for complete search history.

(56) References Cited

U.S. PATENT DOCUMENTS

| | | | | |
|---|---|---|---|---|
| 2,892,525 A | * | 6/1959 | Wilson | F16D 43/18 192/105 R |
| 4,124,106 A | | 11/1978 | Clauss | |
| 4,305,493 A | * | 12/1981 | Silberschlag | F16H 45/02 192/105 CE |
| 4,616,743 A | * | 10/1986 | Havemann | F16D 43/18 192/105 BA |
| 5,048,657 A | * | 9/1991 | Dissett | F16D 47/02 192/105 CD |
| 6,247,570 B1 | * | 6/2001 | Zindler | F16D 43/18 192/109 R |

(Continued)

FOREIGN PATENT DOCUMENTS

| | | |
|---|---|---|
| CN | 2916248 | 6/2007 |
| DE | 102008001260 A1 | 10/2009 |

(Continued)

OTHER PUBLICATIONS

EP Appln No. 21167487 Search Report.
English Abstract for CN2916248.
English Abstract for JP2014009766.

*Primary Examiner* — David R Morris
(74) *Attorney, Agent, or Firm* — Patricia S. Whitehouse

(57) ABSTRACT

A centrifugal clutch of a transport refrigeration unit incorporating a wear limiter includes a drum, a hub, at least two friction pad assemblies, and at least one spring (e.g., leaf or coil) between each respective friction pad assembly. The wear limiter may be configured as part of the leaf spring, as part of the friction pad assemblies, and/or as a standalone component. The wear limiter is configured to prevent the radially outward facing surface of at least one friction pad assembly from engaging the internally facing surface of the drum when the centrifugal clutch is in the extended position and the friction material of at least one friction pad assembly is worn to a worn thickness. This may prevent the centrifugal clutch from engaging when the friction pad is worn.

4 Claims, 9 Drawing Sheets

(56) References Cited

U.S. PATENT DOCUMENTS 11,378,141 B2 * 7/2022 Conway ............... B60H 1/3222
2021/0254673 A1 * 8/2021 Conway .................. F16D 43/18

FOREIGN PATENT DOCUMENTS

GB         1259696 A     1/1972
JP        2014009766     2/2014

* cited by examiner

# WEAR LIMITER FOR CENTRIFUGAL CLUTCH

CROSS REFERENCE TO A RELATED APPLICATION

The application claims the benefit of U.S. Provisional Application No. 63/008,879 filed Apr. 13, 2020, the contents of which are hereby incorporated in their entirety.

BACKGROUND

Refrigerated trucks and trailers are commonly used to transport perishable goods, such as, for example, produce, meat, poultry, fish, dairy products, cut flowers, and other fresh or frozen perishable products. To maintain the perishable goods, typically, a transport refrigeration unit is mounted to the truck or to the trailer. The transport refrigeration unit can be driven either mechanically (e.g., via a direct mechanical coupling or belt drive) or electrically. When mechanically driven, the transport refrigeration unit typically can derive power either from the vehicle engine or from an independent engine inside the transport refrigeration unit.

When the engine is not running, or isn't running at a high enough speed, typically the transport refrigeration unit is powered by an electrical standby motor. Once the engine is running and is at a high enough speed, the transport refrigeration unit switches from being electrically driven (e.g., by the electric standby motor) to being mechanically driven (e.g., by the vehicle engine or the independent engine inside the transport refrigeration unit). To facilitate the engagement of the engine (e.g., the vehicle engine or the independent engine) by the transport refrigeration unit, typically a clutch (e.g., a centrifugal clutch) is used. The clutch allows the engine to develop enough speed and torque before it is engaged to rotate the compressor of the transport refrigeration unit. Without allowing the engine to develop enough speed and torque, the resistance to rotation from the compressor at the onset could potentially cause the engine to stall.

Conventional centrifugal clutches have a pair of friction pads mounted to the driving rotor or hub through pivot posts. To retract the friction pads and to control the torque-speed curve, conventional centrifugal clutches typically use a biasing mechanism (e.g. one or more leaf springs or coil springs). As the engine develops speed and centrifugal force, the biasing mechanism is forced open, allowing for the friction pads to radially extend outward toward the clutch drum. To engage the clutch drum and provide enough torque to allow the transport refrigeration unit's loads to be driven by the engine, the friction pads need to form a sufficient contact with the clutch drum. To provide sufficient contact, the friction pads commonly use a layer of friction material (e.g., synthetic resin impregnated with metal, organic, or ceramic fibers), which may be supported on a layer of metal (e.g., steel). This layer of friction material wears down as the clutch is repeatedly used (e.g., repeated slipping of the clutch can cause wearing of the friction material), which, if worn far enough, has the potential to expose the metal support.

Once the friction material on the friction pads is worn down to the point that the metal support is exposed, there is potential for damage to be caused to the clutch and/or other components (e.g., the drum). Additionally, with this drum being traditionally made of a metal, the metal support, if coming into with the drum, has the potential to cause a product safety issue (e.g., through the generation of heat and/or sparks). Currently there is no way to prevent the metal on metal contact from occurring when the friction material on the friction pads is worn down to the point the metal support is exposed.

Accordingly, there remains a need for a centrifugal clutch that is capable of preventing, or at least mitigating, the metal on metal contact from occurring when the friction material on a friction pad is worn.

BRIEF DESCRIPTION

According to one embodiment a centrifugal clutch of a transport refrigeration unit is provided. The centrifugal clutch includes a drum, a hub, at least two friction pad assemblies, and at least one leaf spring. The drum includes an internally facing surface. The hub is disposed within the drum. The hub is configured to be rotatably driven by an engine configured to power the transport refrigeration unit. The friction pad assemblies are connected to the hub. Each friction pad assembly includes a heel, a toe, and a radially outward facing surface. The radially outward facing surface includes a friction material for contacting the internally facing surface of the drum. The friction material has an installed thickness. At least one leaf spring is configured between each respective friction pad assembly. Each leaf spring includes an internally facing surface. The internally facing surface includes a wear limiter.

In accordance with additional or alternative embodiments, the centrifugal clutch defines an extended position and a retracted position.

In accordance with additional or alternative embodiments, the centrifugal clutch is in an extended position when the hub is rotatably driven at 400 RPMs or greater.

In accordance with additional or alternative embodiments, the wear limiter is configured to prevent the radially outward facing surface of at least one friction pad assembly from engaging the internally facing surface of the drum when the centrifugal clutch is in the extended position and the installed thickness is worn to a worn thickness.

In accordance with additional or alternative embodiments, the worn thickness is approximately 10% of the installed thickness.

In accordance with additional or alternative embodiments, the centrifugal clutch is configured to transmit a torque from the engine to a compressor within the transport refrigeration unit.

According to another aspect of the disclosure, a centrifugal clutch of a transport refrigeration unit is provided. The centrifugal clutch includes a drum, a hub, at least two friction pad assemblies, and at least one leaf spring. The drum includes an internally facing surface. The hub is disposed within the drum. The hub is configured to be rotatably driven by an engine configured to power the transport refrigeration unit. The friction pad assemblies are connected to the hub. Each friction pad assembly includes a heel including a wear limiter, a toe, and a radially outward facing surface. The radially outward facing surface includes a friction material for contacting the internally facing surface of the drum. The friction material has an installed thickness. At least one leaf spring is configured between each respective friction pad assembly. Each leaf spring includes an internally facing surface.

In accordance with additional or alternative embodiments, the centrifugal clutch defines an extended position and a retracted position.

In accordance with additional or alternative embodiments, the centrifugal clutch is in an extended position when the hub is rotatably driven at 400 RPMs or greater.

In accordance with additional or alternative embodiments, the wear limiter is configured to prevent the radially outward facing surface of at least one friction pad assembly from engaging the internally facing surface of the drum when the centrifugal clutch is in the extended position and the installed thickness is worn to a worn thickness.

In accordance with additional or alternative embodiments, the worn thickness is approximately 10% of the installed thickness.

In accordance with additional or alternative embodiments, the centrifugal clutch is configured to transmit a torque from the engine to a compressor within the transport refrigeration unit.

According to another aspect of the disclosure, a centrifugal clutch of a transport refrigeration unit is provided. The centrifugal clutch includes a drum, a hub, at least two friction pad assemblies, at least one spring, and at least one wear limiter. The drum includes an internally facing surface. The hub is disposed within the drum. The hub is configured to be rotatably driven by an engine configured to power the transport refrigeration unit. The friction pad assemblies are connected to the hub. Each friction pad assembly includes a heel, a toe, and a radially outward facing surface. The radially outward facing surface includes a friction material for contacting the internally facing surface of the drum. The friction material has an installed thickness. At least one spring is configured between each respective friction pad assembly. At least one wear limiter is configured between each respective friction pad assembly.

In accordance with additional or alternative embodiments, the centrifugal clutch defines an extended position and a retracted position.

In accordance with additional or alternative embodiments, the centrifugal clutch is in an extended position when the hub is rotatably driven at 400 RPMs or greater.

In accordance with additional or alternative embodiments, the wear limiter is configured to prevent the radially outward facing surface of at least one friction pad assembly from engaging the internally facing surface of the drum when the centrifugal clutch is in the extended position and the installed thickness is worn to a worn thickness.

In accordance with additional or alternative embodiments, the worn thickness is approximately 10% of the installed thickness.

In accordance with additional or alternative embodiments, the centrifugal clutch is configured to transmit a torque from the engine to a compressor within the transport refrigeration unit.

In accordance with additional or alternative embodiments, the wear limiter has at least one of: a rod configuration and a spring configuration.

In accordance with additional or alternative embodiments, the spring is at least one of: a leaf spring and a coil spring.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

It is critically important to prevent the metal support of the friction pad assembly (e.g., of a centrifugal clutch within a transport refrigeration unit) from coming into contact with the metal surface of the drum so as to prevent, or at least mitigate, product safety issues. If the friction material on one or more friction pads wears down to the point that the metal support is exposed, the metal support may come into contact with the metal surface of the drum if the centrifugal clutch is able to fully extend. When these two metal surfaces come into contact with one another, heat and/or sparks can potentially be generated, which may present product safety issues.

To help prevent the metal surfaces from coming into contact with one another when the centrifugal clutch is in an extended position, a centrifugal clutch of a transport refrigeration with a wear limiter is provided. In certain instances, the wear limiter may be configured as part of a leaf spring (e.g., extending from the internally facing surface of the leaf spring), as part of a friction pad assembly (e.g., extending from the heel of the friction pad assembly), and/or as a standalone component (e.g., spanning between two friction pad assemblies). Regardless of the specific configuration, the wear limiter is configured to prevent the radially outward facing surface of at least one friction pad assembly from engaging the internally facing surface of the drum when the centrifugal clutch is in the extended position and the friction material of at least one friction pad assembly is worn to a worn thickness. To prevent metal on metal contact the wear limiter may restrict how far the centrifugal clutch is capable of extending (e.g., preventing the extension of the centrifugal clutch beyond the point at which the friction material is considered to have a worn thickness).

Figure 1:
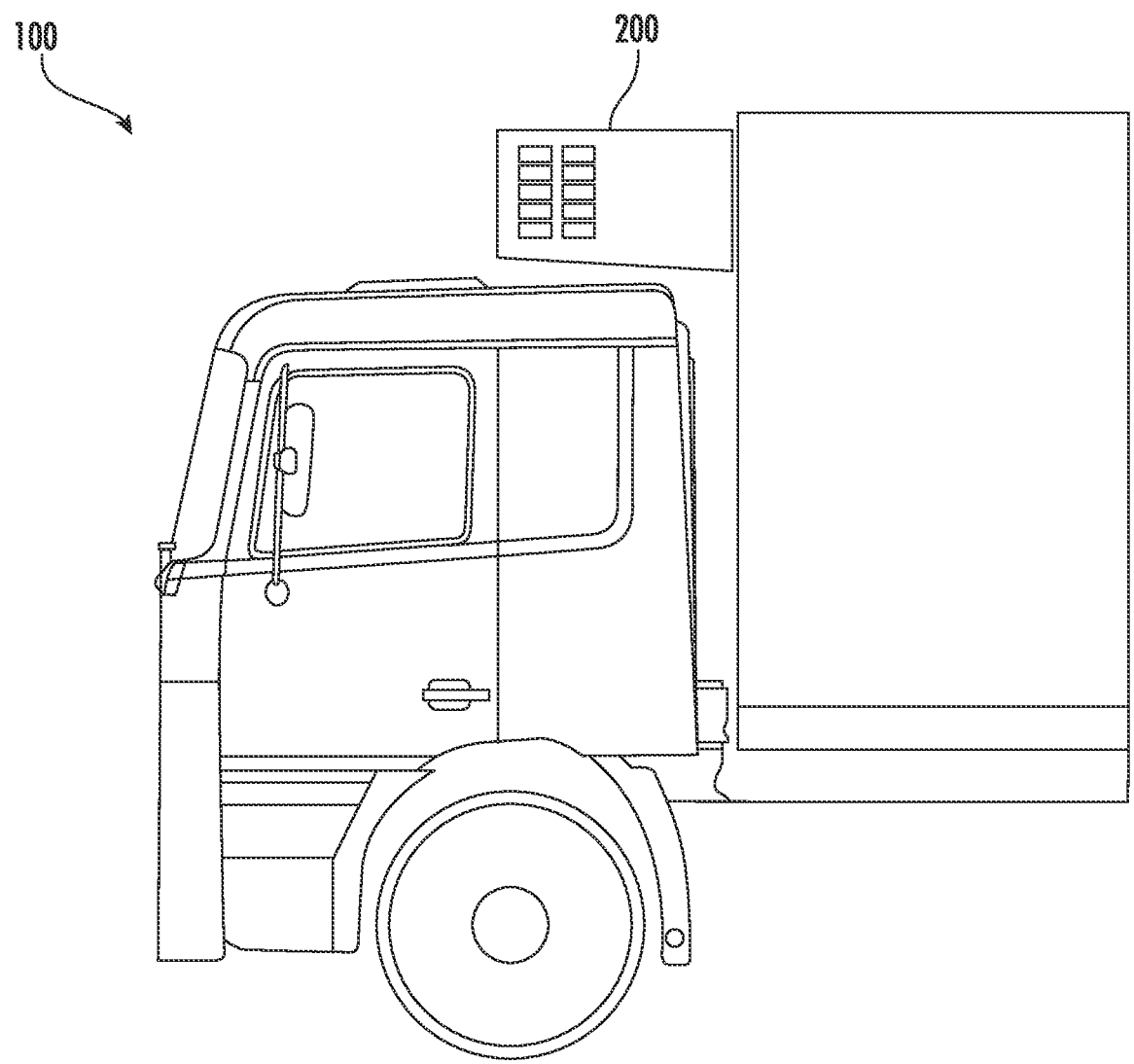
FIG. 1 is a perspective view of a truck with a transport refrigeration unit in accordance with one aspect of the disclosure.
Figure 2:
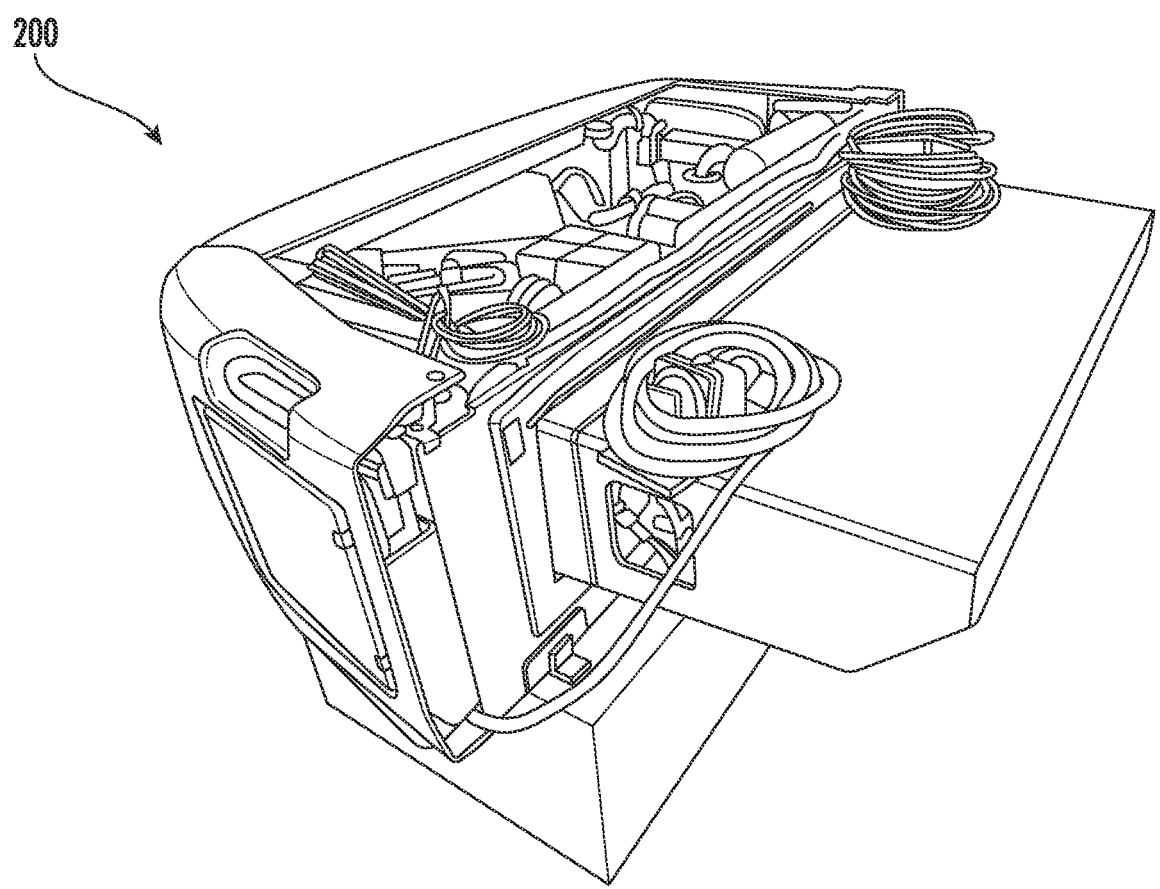
FIG. 2 is a perspective view of a transport refrigeration unit in accordance with one aspect of the disclosure.
Figure 3:
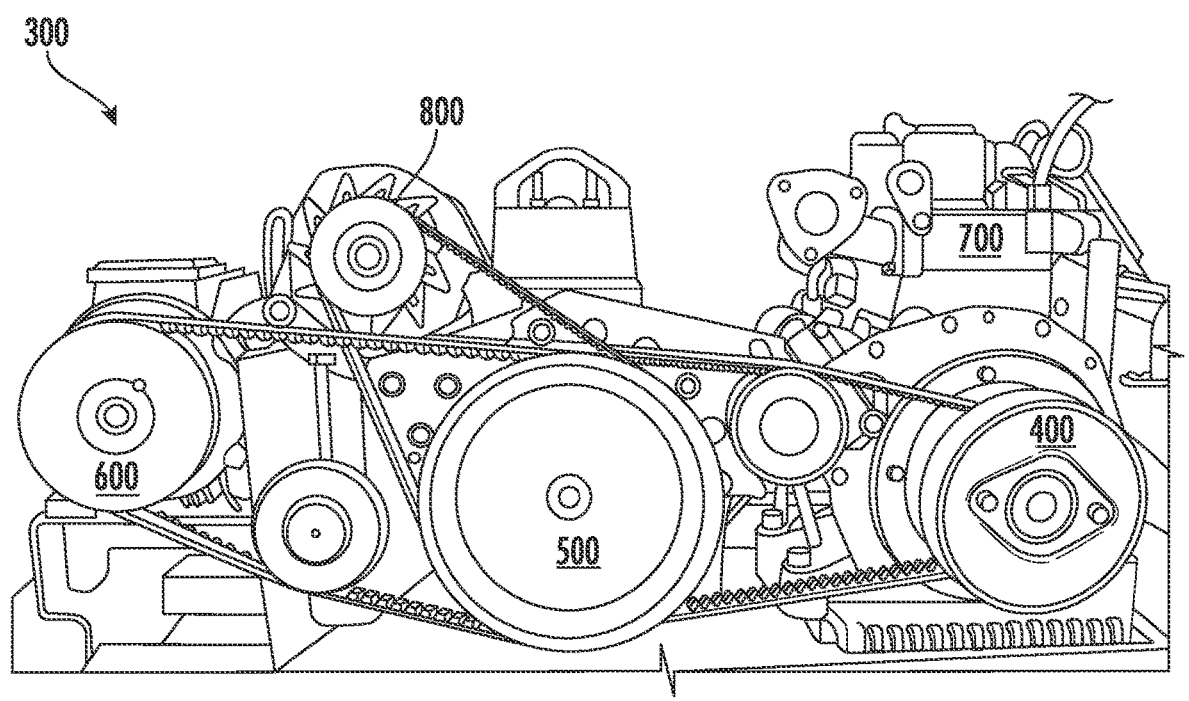
FIG. 3 is a perspective view of the powertrain of the transport refrigeration unit shown in FIG. 2 with a centrifugal clutch in accordance with one aspect of the disclosure.

With reference now to the Figures, an exemplary transport refrigeration unit 200 mounted to a refrigerated truck 100 is shown in FIG. 1. Transport refrigeration units use centrifugal clutches to facilitate the transmission of the engine power (e.g. the vehicle engine or the independent engine within the transport refrigeration unit) to the transport refrigeration unit's load. A standalone transport refrigeration unit 200 is shown in FIG. 2. The transport refrigeration unit 200 includes a compressor 500 (shown in FIG. 3), a condenser (not shown), an evaporator coil (not shown), and an evaporator fan (not shown). As shown in FIG. 3, the transport refrigeration unit 200 (e.g., the compressor 500 of the transport refrigeration unit 200) can be driven by an independent engine 700 (e.g., a diesel engine) within the transport refrigeration unit 200.

FIG. 3 depicts a powertrain 300 of a transport refrigeration unit 200. The powertrain 300 of a transport refrigeration unit 200 may include a centrifugal clutch 400, a compressor 500, an electric motor 600, an independent engine 700 (e.g., within the transport refrigeration unit 200), and an alternator 800. The centrifugal clutch 400 may drive the loads in the powertrain 300, which may consist of a compressor 500, electric motor 600, and alternator 800. For example, the centrifugal clutch 400 may not engage the engine 700 until the engine 700 develops enough speed and torque. As an alternative to being driven by the engine 700, the compressor 500 may be driven by the electric motor 600 so that the centrifugal clutch 400 does not transmit any torque to the engine. By using a centrifugal clutch 400 the transport refrigeration unit 200 may gradually apply the loads in the powertrain 300 to avoid inadvertent engine 700 stalling, which could occur if the loads in the powertrain 300 were applied to the engine 700 before the engine 700 developed enough speed and torque.

Figure 4:
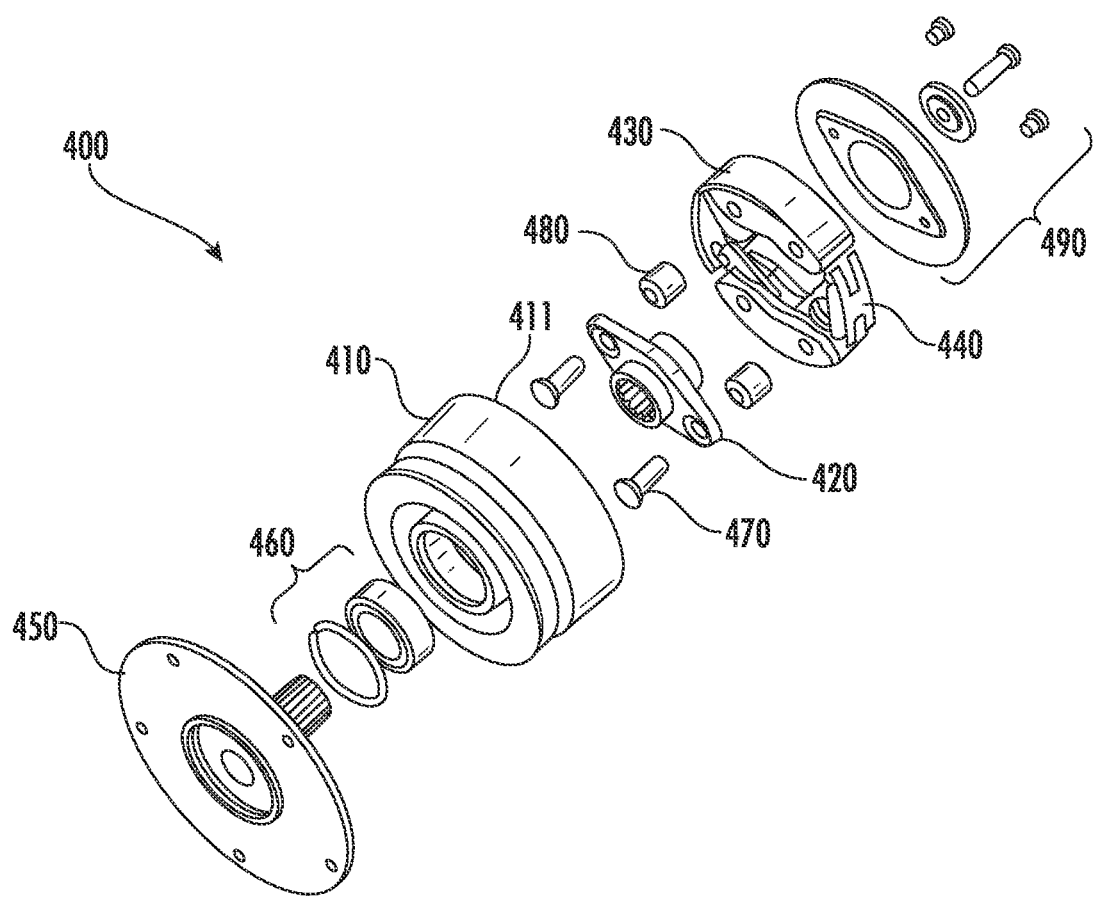
FIG. 4 is an exploded view of the centrifugal clutch shown in FIG. 3 in accordance with one aspect of the disclosure.

An exploded view of a centrifugal clutch 400 of a transport refrigeration unit 200 is shown in FIG. 4. The centrifugal clutch 400 includes a drum 410, a hub 420, at least two friction pad assemblies 430, and at least one spring (e.g., leaf spring or coil spring) 440 configured between each respective friction pad assembly 430. The drum 410 includes an internally facing surface 411. The hub 420 is configured to be disposed within the drum 410. The hub 420 is configured to be rotatably driven by an engine 700 within a transport refrigeration unit 200. For example, the hub 420 may be connected to a flywheel 450 so that the hub 420 can rotatably driven within the drum 410. In certain instances, the drum 410 is disposed between the hub 420 and the flywheel 450 with bearings 460 at the intersection of the flywheel 450 and the drum 410. The friction pad assemblies 430 are connected to the hub 420, for example, using one or more shaft 470 and/or bushing 480. Each friction pad assembly 430 includes a radially outward facing surface 431 (shown in FIGS. 6-9), which includes a friction material for contacting the internally facing surface 411 of the drum 410. When installed, the friction material of each friction pad assembly 430 may have an installed thickness. However, repeated or undesired use of the friction pad 430 may cause the friction material to become worn (e.g., causing the friction material to have a worn thickness).

The spring (e.g., the leaf spring or coil spring) 440 may help pull the friction pad assemblies 430 inward, away from the internally facing surface 411 of the drum 410 until the engine 700 develops enough speed that the centrifugal forces of the friction pad assemblies 430 overcome the leaf spring 440 forces so that the outward facing surface 431 contacts the internally facing surface 411 and the friction between them develops torque to drive the compressor 500.

When the friction pad assemblies 430 are pulled away from the internally facing surface 411 of the drum 410 (e.g., keeping the friction material from touching the internally facing surface 411 when the friction material does not have a worn thickness) the centrifugal clutch 400 may be said to be in a retracted position. When the friction pad assemblies 430 are spread outward toward the internally facing surface 411 of the drum 410 (e.g., allowing the outward facing surface 431 to touch the internally facing surface 411 when the friction material does not have a worn thickness) the centrifugal clutch 400 may be said to be in an extended position.

The centrifugal clutch 400 may go from the retracted position to the extended position relative to the speed of the engine 700. This may be due, at least in part, to an increase in centrifugal force that is generated as the speed of the engine 700 increases. For example, as the speed of the engine 700 increases, the rotational speed of the hub 420 and the friction pad assemblies 430 increases, which may result in an increase in centrifugal force. Each spring (e.g., leaf spring or coil spring) 440 may be designed to resist a certain amount of centrifugal force so that the centrifugal clutch 400 is in an extended position, driving the loads in the powertrain 300, only when the engine 700 has generated the desired speed. At what point the centrifugal clutch 400 is designed to engage the engine 700 may be dependent on a number of factors including, but not limited to, the size of the compressor 500 and/or the particular cooling load necessitated by the design of the transport refrigeration unit 200.

Figure 5:
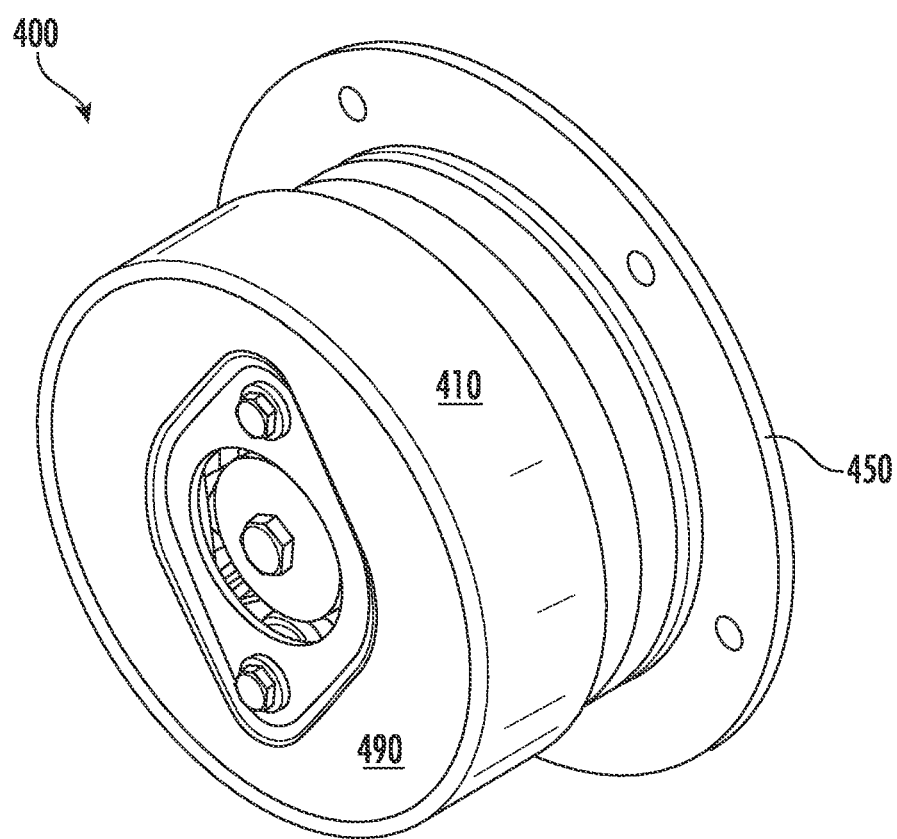
FIG. 5 is an assembled view of the centrifugal clutch shown in FIG. 3 in accordance with one aspect of the disclosure.

The centrifugal clutch 400, in certain instances, is not in an extended position until the hub 420 is rotatably driven at 400 RPMs or greater. For example, the centrifugal clutch 400 may not be in an extended position until the hub 420 is rotateably driven at least 400 RPMs, at least 500 RPMs, at least 600 RPMs, at least 700 RPMs, at least 800 RPMs, at least 900 RPMs, at least 1000 RPMs, at least 1100 RPMs, at least 1200 RPMs, at least 1300 RPMs, at least 1400 RPMs, at least 1500 RPMs, or at least 1600 RPMs. For example, in certain instances, if the hub 420 is not rotatably driven at least 400 RPMs the friction pad assemblies 430 will not engage the internally facing surface 411 of the drum 410, meaning that the compressor 500 may not be driven by the engine 700. To cover the centrifugal clutch 400 during this rotation a plate 490 may be used. An assembled view a centrifugal clutch 400 with the plate 490 is shown in FIG. 5.

To ensure that the engine 700 is capable of being engaged by the centrifugal clutch 400 it is important that the engine 700 has developed enough speed. If the engine 700 doesn't develop enough speed then not enough friction will be generated between the friction pad assemblies 430 and the internally facing surface 411 of the drum 410 to provide enough torque to drive the loads in the powertrain 300 so that the rotational speed of the drum 410 is the same as the engine 700. In this case the clutch 400 is said to be slipping and not fully engaged. Slipping of the clutch 400 may cause the friction material on the friction pad assemblies 430 to wear down (e.g., reducing the thickness of the friction material). However, it should be expected that even routine use (e.g., without slipping) may cause the friction material on the friction pad assemblies 430 to wear down, which may be unavoidable. When the friction material wears out beyond a certain threshold the friction pad assemblies 430 may need to be replaced in order for the friction pad assemblies 430 to be able to engage the internally facing surface 411 of the drum 410.

As described above, it is particularly important to prevent the friction pad assemblies 430 from engaging the internally facing surface 411 of the drum 410 when the friction material wears out so as to prevent the metal on metal contact from occurring. To help prevent the radially outward facing surface 431 of the friction pad assemblies 430 from engaging the internally facing surface 411 of the drum 410 when the centrifugal clutch is in the extended position and the friction material is worn to a worn thickness at least one wear limiter 401 may be installed within the centrifugal clutch 400. The wear limiter 401 may be configured as part of a leaf spring 440, as part of a friction pad assembly 430, and/or as a standalone component. It should be appreciated that a centrifugal clutch 400 may incorporate multiple wear limiters 401 with the same or different configurations.

Figure 6:
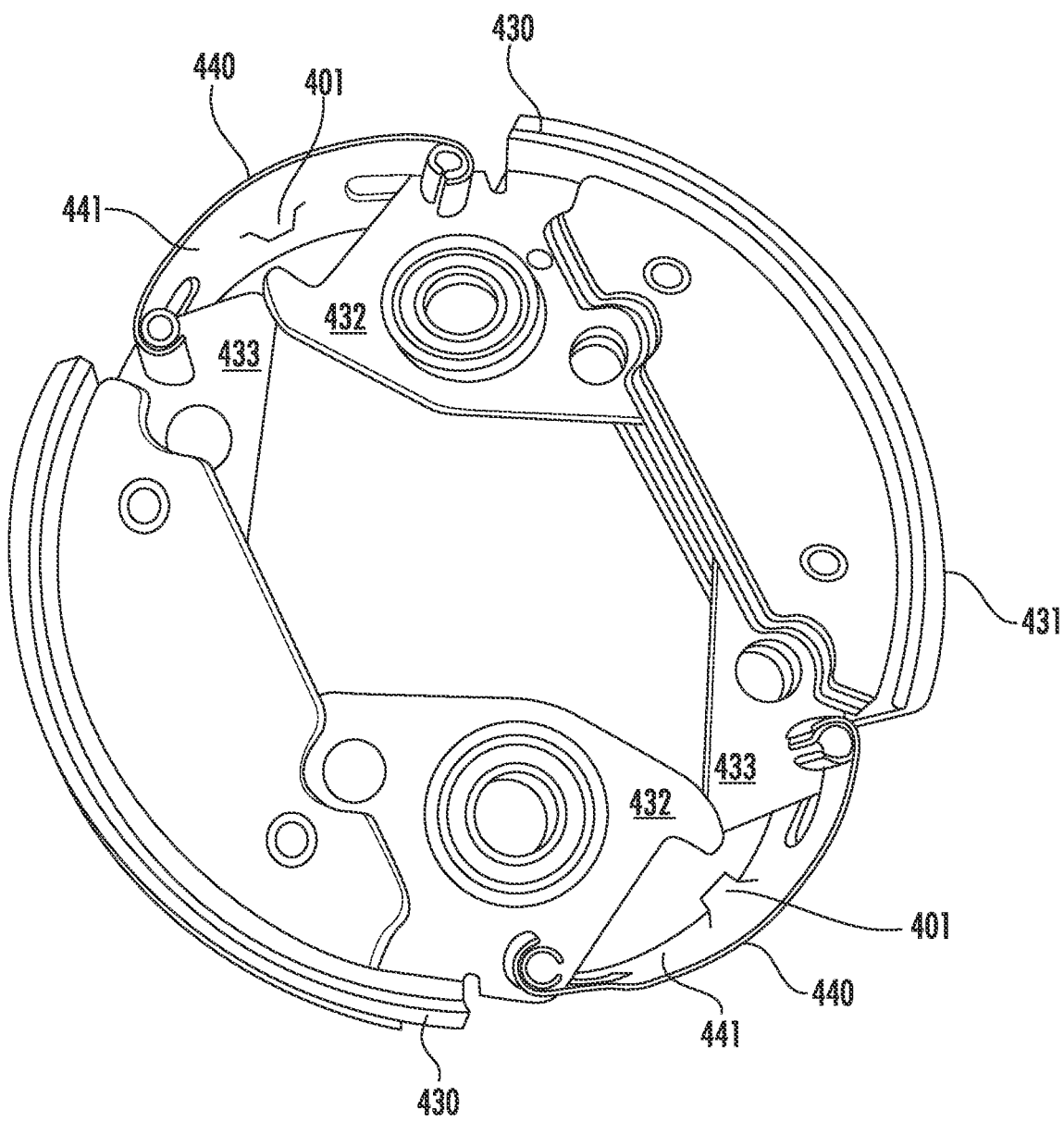
FIG. 6 is a partially assembled view of the centrifugal clutch shown in FIG. 3 with two leaf springs configured between two friction pad assemblies, each leaf spring including a wear limiter in accordance with one aspect of the disclosure.

A partially assembled view of a centrifugal clutch 400 with two friction pad assemblies 430, each including a heel 432 and a toe 433, and two leaf springs 440 with wear limiters 401 is shown in FIG. 6. It is envisioned that each leaf spring 440 may be configured as one unified structure (e.g., formed of one continuous piece of metal), for example, where the wear limiter 401 is unified with the leaf spring 440. The wear limiter 401 of each respective leaf spring 440 may be configured to engage the heel 432 of a friction pad assembly 430 when the centrifugal clutch 400 is in the extended position. To prevent the radially outward facing surface 431 of the friction pad assembly 430 from engaging the internally facing surface 411 of the drum 410 when the friction material of the friction pad assembly 430 has a worn thickness, the wear limiter 401 may be configured to extend radially inward so as to limit the radial distance the centrifugal clutch 400 can extend (e.g., preventing the friction material from contacting the internally facing surface 411 of the drum 410 when the friction material has a worn thickness). For example, the wear limiter 401 may prevent the spring 440 from flattening out beyond a certain point.

Figure 7:
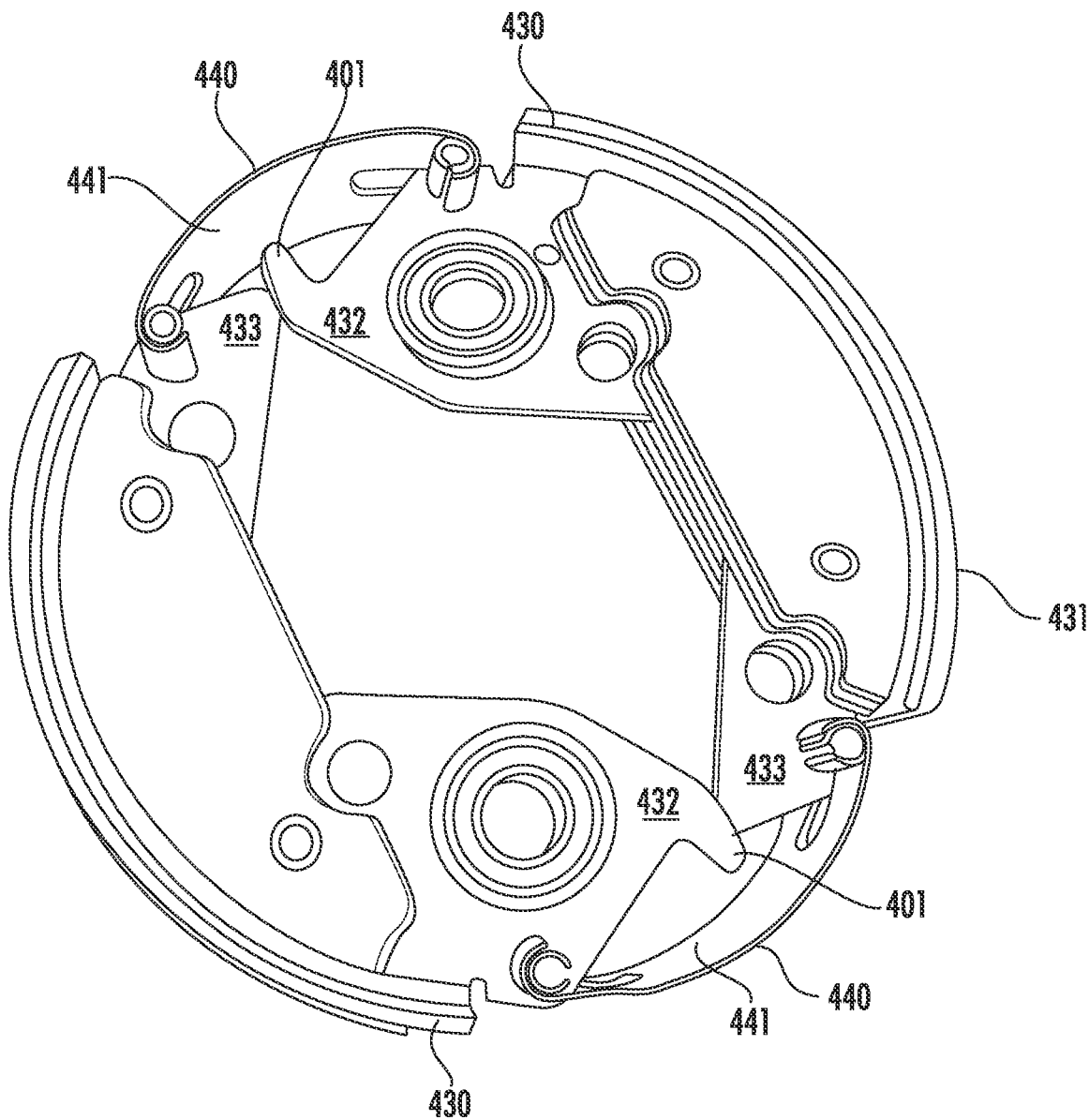
FIG. 7 is a partially assembled view of the centrifugal clutch shown in FIG. 3 with two leaf springs configured between two friction pad assemblies, each friction pad assembly including a wear limiter in accordance with one aspect of the disclosure.

A partially assembled view of a centrifugal clutch 400 with two friction pad assemblies 430, each including a heel 432 and a toe 433, and two leaf springs 440 is shown in FIG. 7. As depicted, each heel 432 includes a wear limiter 401. It is envisioned that the heel 432 and the wear limiter 401 may be configured as one unified structure (e.g., formed of one continuous piece of metal), for example, where the wear limiter 401 is unified with the heel 432. The wear limiter 401 from each respective heel 432 may be configured to engage the internally facing surface 441 of a leaf spring 440 when the centrifugal clutch 400 is in the extended position. To prevent the radially outward facing surface 431 of the friction pad assembly 430 from engaging the internally facing surface 411 of the drum 410 when the friction material of the friction pad assembly 430 has a worn thickness, the wear limiter 401 may be configured to extend radially outward so as to limit the radial distance the centrifugal clutch 400 can extend (e.g., preventing the friction material from contacting the internally facing surface 411 of the drum 410 when the friction material has a worn thickness). For example, the wear limiter 401 may prevent the spring 440 from flattening out beyond a certain point.

Figure 8:
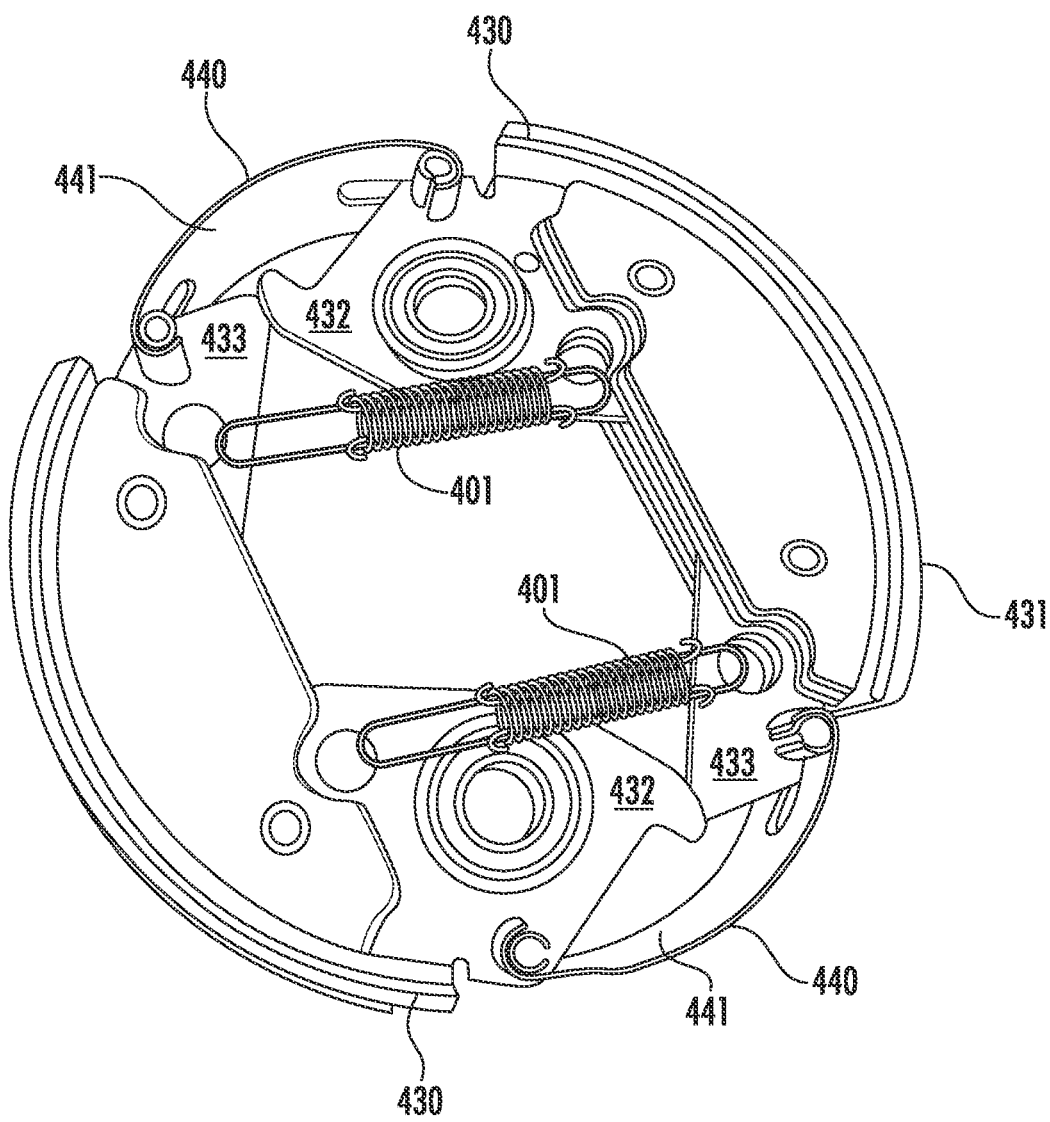
FIG. 8 is a partially assembled view of the centrifugal clutch shown in FIG. 3 with two leaf springs and two wear limiters configured between two friction pad assemblies in accordance with one aspect of the disclosure.
Figure 9:
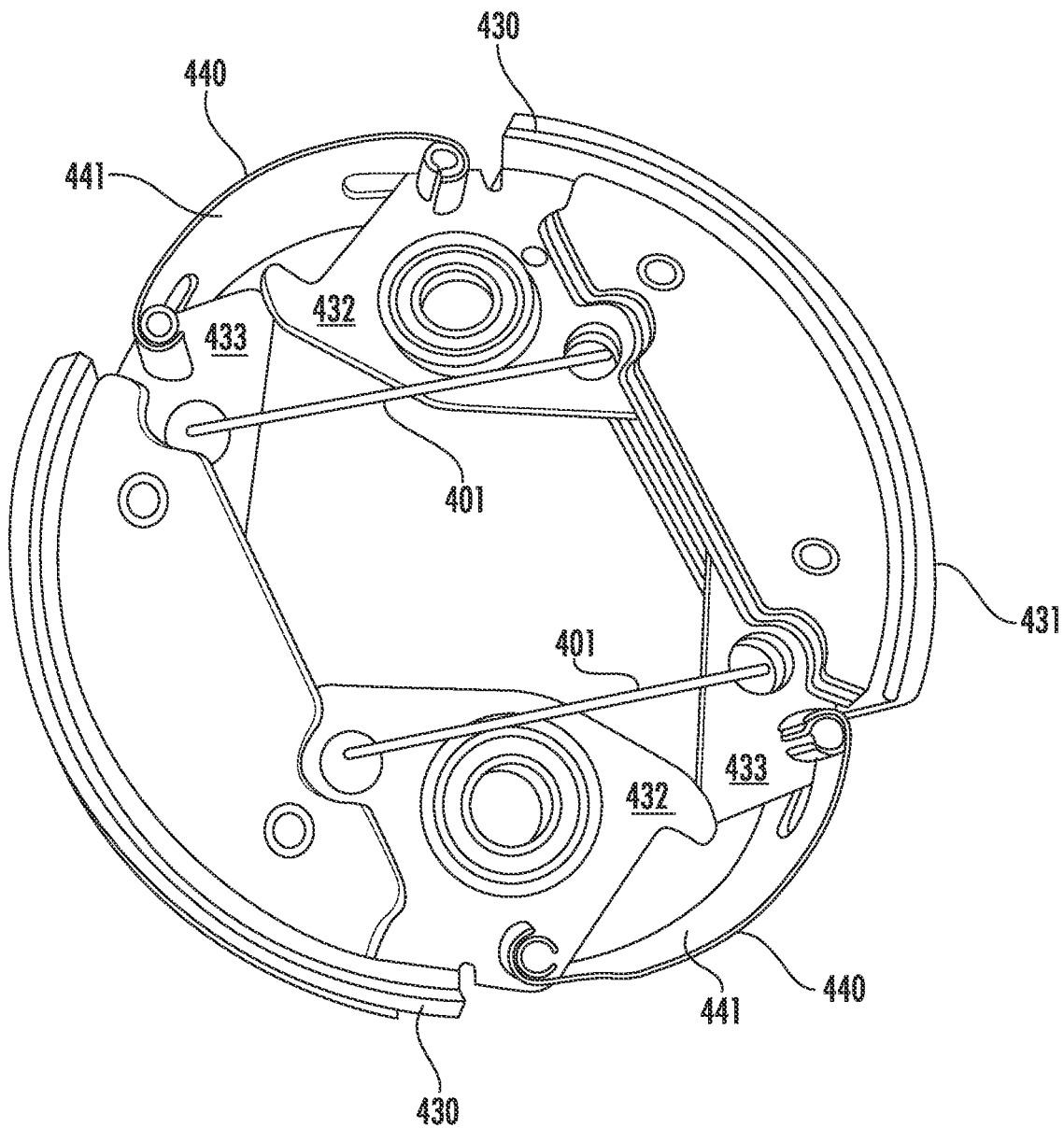
FIG. 9 is a partially assembled view of the centrifugal clutch shown in FIG. 3 with two leaf springs and two wear limiters configured between two friction pad assemblies in accordance with one aspect of the disclosure.

A partially assembled view of a centrifugal clutch 400 with two friction pad assemblies 430, each including a heel 432 and a toe 433, and two leaf springs 440 is shown in FIGS. 8 and 9. As depicted, the centrifugal clutch 400 includes two wear limiters 401 configured between each respective friction pad assembly 430 (e.g., spanning from the heel 432 of one friction pad assembly 430 to the toe of another friction pad assembly 430). As shown in FIG. 8, in certain instances, the wear limiter 401 is configured in a spring configuration (e.g., as a drawbar spring). When configured in a spring configuration, the wear limiter 401 may have a mechanism for limiting the expansion of the spring (e.g., a rod extending through the center of the spring). As shown in FIG. 9, in certain instances, the wear limiter 401 is configured in a rod configuration. Regardless of whether the wear limiter 401 is configured in a rod or spring configuration, the wear limiter 401 may prevent the radially outward facing surface 431 of the friction pad assembly 430 from engaging the internally facing surface 411 of the drum 410 when the friction material of the friction pad assembly 430 has a worn thickness by limiting the radial distance the centrifugal clutch 400 can extend (e.g., preventing the friction material from contacting the internally facing surface 411 of the drum 410 when the friction material has a worn thickness).

Regardless of the configuration of the wear limiter 401, the wear limiter 401 is configured to prevent the radially outward facing surface 431 of at least one friction pad assembly 430 from engaging the internally facing surface 411 of the drum 410 when the centrifugal clutch 400 is in the extended position and the installed thickness is worn to a worn thickness. The friction material of any given friction pad assembly 430 may, in certain instances, be said to have a worn thickness when 10% of the friction material is left (e.g., meaning that, in certain instances, 90% of the friction material may be worn off a friction pad 430 before it needs replacement). The worn thickness, in certain instances, may be between 1% and 10%, between 1% and 15%, between 1% and 20%, between 1% and 30%, between 1% and 40%, between 1% and 50%, between 10% and 15%, between 10% and 20%, between 10% and 30%, between 10% and 40%, between 10% and 50%, between 15% and 20%, between 15% and 30%, between 15% and 40%, between 15% and 50%, between 20% and 30%, between 20% and 40%, between 20% and 50%, between 30% and 40%, between 30% and 50%, or between 40% and 50% of the installed thickness. It should be appreciated that the friction material may be considered to have a worn thickness when less than 1% and greater than 50% of the friction material is left.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A centrifugal clutch of a transport refrigeration unit, the centrifugal clutch comprising:
    a drum comprising an internally facing surface;
    a hub disposed within the drum, the hub configured to be rotatably driven by an engine configured to power the transport refrigeration unit;
    at least two friction pad assemblies connected to the hub, each friction pad assembly comprising a heel, a toe, and a radially outward facing surface, the radially outward facing surface comprising a friction material for contacting the internally facing surface of the drum, the friction material comprising an installed thickness; and at least one leaf spring configured between each respective friction pad assembly, each leaf spring comprising an internally facing surface, the internally facing surface comprising a wear limiter, wherein the wear limiter is unified with the leaf spring, the wear limiter configured to prevent the radially outward facing surface of at least one friction pad assembly from engaging the internally facing surface of the drum when the centrifugal clutch is in an extended position and the installed thickness is worn to a worn thickness, and wherein the wear limiter is configured to engage the heel when the centrifugal clutch is in the extended position.

2. The centrifugal clutch of claim 1, wherein the centrifugal clutch is in an extended position when the hub is rotatably driven at 400 RPMs or greater.

3. The centrifugal clutch of claim 1, wherein the worn thickness is approximately 10% of the installed thickness.

4. The centrifugal clutch of claim 1, wherein the centrifugal clutch is configured to transmit a torque from the engine to a compressor within the transport refrigeration unit.

\* \* \* \* \*